United States Patent [19]

Owen

[11] 4,349,511
[45] Sep. 14, 1982

[54] AIR PURIFICATION APPARATUS

[75] Inventor: Charles B. Owen, Mundelein, Ill.

[73] Assignee: Environmental Electronics Corporation, Northbrook, Ill.

[21] Appl. No.: 281,703

[22] Filed: Jul. 9, 1981

[51] Int. Cl.³ .............................................. C01B 13/12
[52] U.S. Cl. .................. 422/186.07; 55/126; 55/150; 55/155; 361/231; 423/581
[58] Field of Search ................... 55/6, 123–126, 55/140–143, 145, 149, 150–153, 154, 155, 279; 361/230–233; 423/581; 250/532–541; 422/186.07

[56] References Cited

U.S. PATENT DOCUMENTS 3,198,726  8/1965  Trikilis ............................ 250/536
3,925,673 12/1975  Wright, Jr. .................... 250/432 R Primary Examiner—Bernard Nozick
Attorney, Agent, or Firm—Dressler, Goldsmith, Shore, Sutker & Milnamow, Ltd.

[57] ABSTRACT

An improved air purification apparatus is disclosed including an arrangement for subjecting air to an electrical discharge for generation of oxygen molecules having a heavier than normal molecular weight. The apparatus includes a modular generator assembly including a plurality of flattened coils of metal wire mesh disposed in a side-by-side array with dielectric plates across which an electrical potential is created. The generator includes a unitary housing for obtaining the electrode elements in their array which facilitates assembly and disassembly of the generator, and mounting of the generator on the chassis of the air purification apparatus.

2 Claims, 4 Drawing Figures

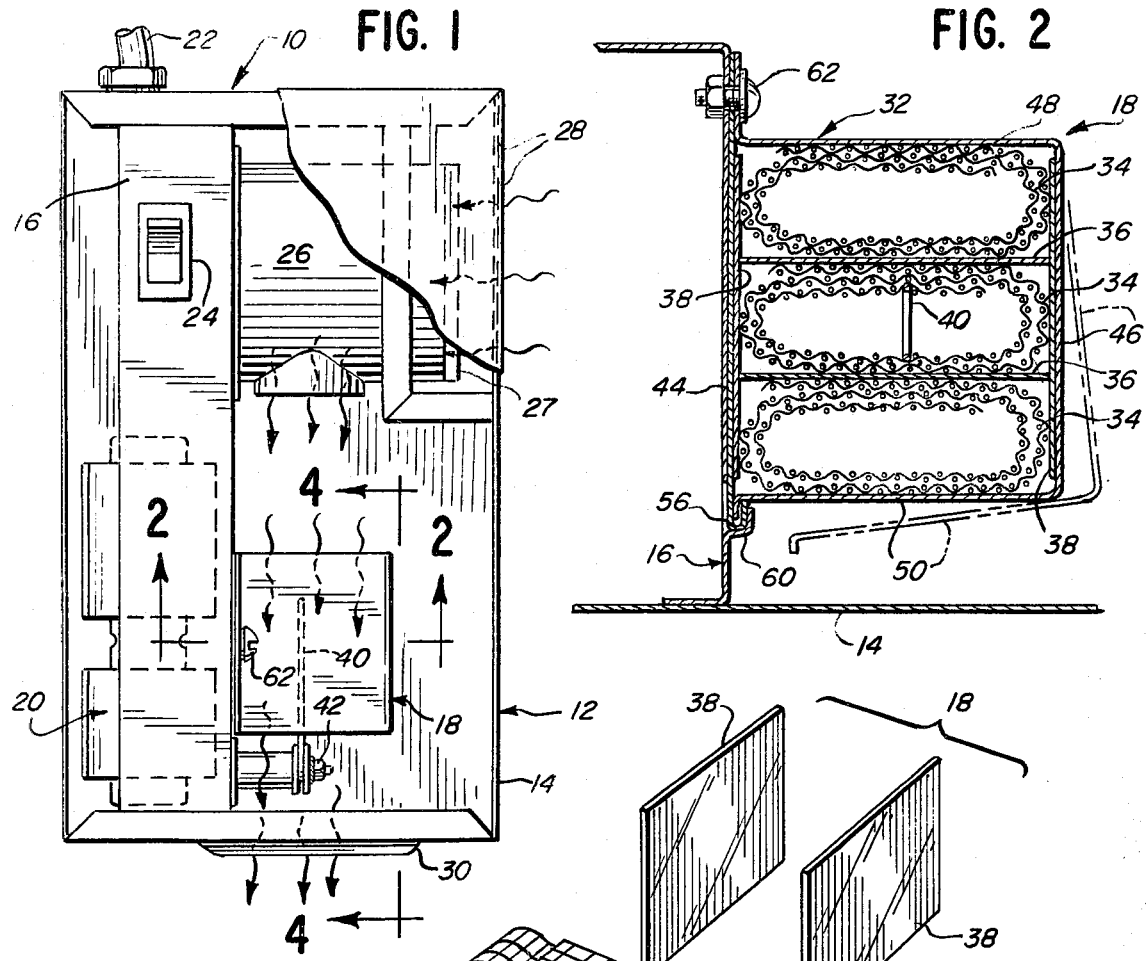
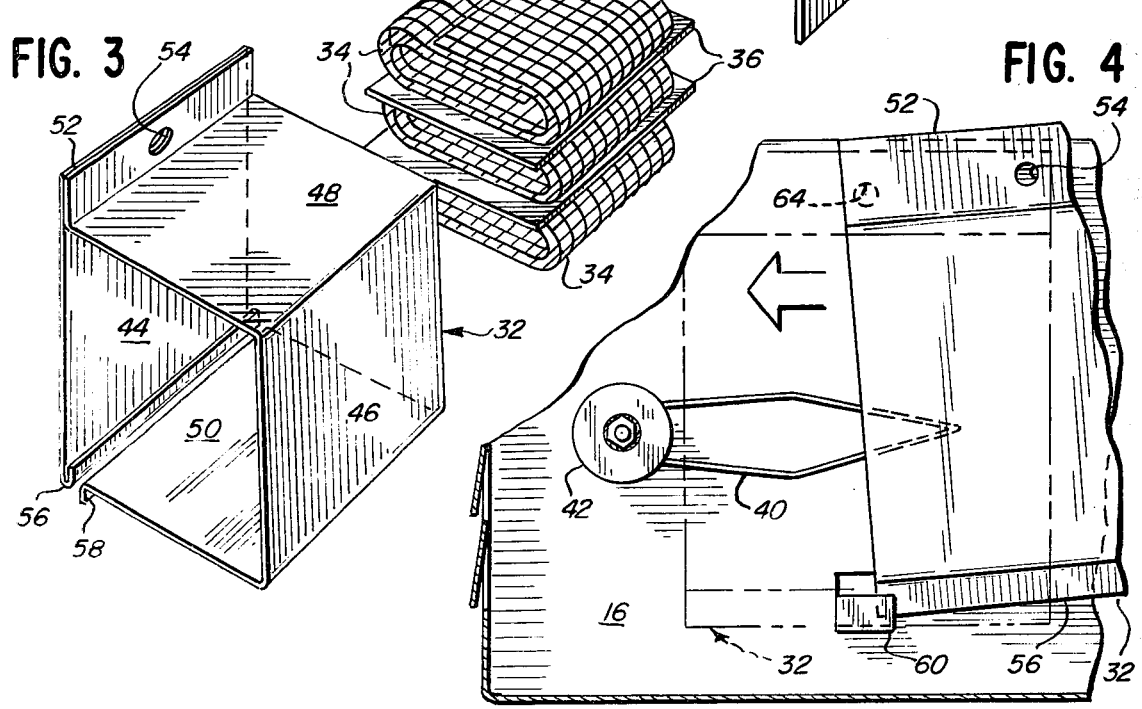

AIR PURIFICATION APPARATUS

FIELD OF THE INVENTION

The present invention relates generally to apparatus for generating oxygen of higher than normal molecular weight, and more particularly to an improved construction for an apparatus accomplishing such generation by means of subjecting air to an electrical discharge.

BACKGROUND OF THE INVENTION

The beneficial properties of heavier than usual molecules of oxygen, such as $O_3$, $O_4$, and $O_5$, are known and are presently taken advantage of in modern environmental control systems. These heavy oxygen forms, particularly those above $O_3$, are highly useful oxidizing agents, especially in air purification applications, since they destroy bacteria, fungi, and other foreign matter. Among other problems, organisms and materials of this nature frequently create objectionable odors.

To this end, a variety of ionizing apparatus have been constructed, all of which provide an electrical discharge to produce heavy oxygen forms. One such apparatus for generating heavy oxygen molecules illustrated in U.S. Pat. No. 3,925,673, issued to Joseph E. Wright, Jr., and has been found effective in generating heavy oxygen molecules, particularly those of an order higher than $O_3$, such as $O_4$ and $O_5$. This is significant in that the Environmental Protection Agency has prescribed limits for the generation of ozone ($O_3$) in heavy oxygen generators, specifically, generation resulting in no more than 0.125 parts per million. Similarly, the Food and Drug Administration limits ozone content from generation to 0.05 parts per million. Apparatus in accordance with the above patent have been found to be sufficiently effective in generating the heavier forms of oxygen that compliance with the more stringent FDA standard may be achieved. The teachings of the above patent not inconsistent with the present disclosure are incorporated herein by reference.

The apparatus for generating heavy oxygen molecules as taught by the above patent includes a generator having a multi-piece container for housing a plurality of coiled, metal wire mesh screens and dielectric plates in a side-by-side array. Mechanical fasteners are provided for connecting the pieces of the container to each other, and for mounting the container on the frame of the unit. An electrical circuit is provided for creating an electrical potential across the interface of adjacent coiled screens for subjecting air moving by the generator to an electrical discharge.

While the above apparatus has proven effective for generation of heavy molecular forms of oxygen, the above-described construction has been found to be somewhat time consuming to assemble. Additionally, disassembly of the unit, including the generator container, is regularly required for cleaning and maintenance purposes. The above construction can make disassembly somewhat of an inconvenience.

Thus, an improved construction for an apparatus for generating heavy oxygen molecules which would facilitate assembly and disassembly would further add to the desirability of these devices.

SUMMARY OF THE INVENTION

In accordance with the present invention, an air purification apparatus for generating heavy oxygen molecules is disclosed, and operates by subjecting air to an electrical discharge. The apparatus includes a plurality of electrode elements each comprised of a flattened tubular spiral or coil of metal wire mesh disposed in a side-by-side array. Dielectric plates, preferably of mica, are provided and disposed between adjacent electrode elements for affecting an insulating separation between adjacent elements of the array.

An electrical circuit is provided including a transformer for establishing an electrical discharge between adjacent electrode elements. The apparatus may further include an electric blower for moving air past the wire mesh spirals of the array, whereby heavy molecules of oxygen are formed by subjecting the air to an electrical discharge supplied from the electrical circuit of the apparatus.

In order to facilitate assembly and disassembly of the apparatus, a unitary housing assembly is provided for retaining the electrode elements in their side-by-side array. The housing assembly releasably retains the electrode elements in their side-by-side array and urges them into contact with the dielectric plates with which they are in contact. The housing assembly has a generally rectangular configuration with open opposite ends in which the electrode elements are disposed so that their open ends face the open ends of the housing.

The unitary nature of the housing is provided by an integral assembly of the four sides of the housing. The assembly includes first and second spaced, generally parallel housing sides, and third and fourth spaced, generally parallel housing sides. The third housing side extends between and is integral with the end portions of the first and second sides. The fourth side is integral with the other edge portion of the second side and extends therefrom generally toward the first side.

A releasable locking arrangement is provided by a locking flange integral with an edge portion of the first side, and a locking lip integral with the edge portion of the fourth side which is adapted to cooperate with the locking flange for lockingly releasably connecting the fourth side to the first. Notably, the housing assembly is preferably formed such that the fourth side is biased away from the first side. In other words, the housing assembly is formed so that it is biased to "open." This biasing action urges the locking lip into engagement with the locking flange when they are interengaged and the housing is "closed" so that the assembly is firmly held together. However, the housing may be easily manipulated so that the locking lip is disengaged from the locking flange and the assembly may be "opened," thus facilitating the required periodic disassembly of the generator for cleaning and maintenance of its components.

As described above, the generator of the apparatus includes a plurality of tubular spirals or coils of metal wire mesh. As will be appreciated, these coils exhibit a fair degree of resiliency when arranged in their assembled array and compressed. This property is exploited by the present invention in that the electrode elements may be formed slightly thicker than when they are in place in the housing assembly. In this way, the electrode elements may be grouped with the dielectric plates in their array and inserted into the housing assembly before the locking lip is moved into engagement with the locking flange, the resilient nature and open configuration of the housing assembly accommodating insertion of the array and facilitating alignment. When the array is within the housing, the housing is readily manipulated and compressed somewhat so that the locking lip may be brought into engagement with the locking flange.

After the locking lip and flange have been locked together, the array of electrode elements and dielectric plates is held firmly and biasingly within the housing due to the resilient, biasing nature of the wire mesh electrode elements. Significantly, this biasing action urges the electrode elements into more positive face-to-face contact with the dielectric plates and the housing than in previously known designs, thus assuring proper performance of the generator, while assembly and disassembly of the apparatus generator is clearly facilitated.

A further feature of the subject invention is a novel mounting arrangement for securing the generator housing to the chassis of the apparatus. This arrangement further facilitates assembly and disassembly of the air purification apparatus.

BRIEF DESCRIPTION OF THE DRAWINGS

FIG. 1 is a cut-away side elevational view of the air purification apparatus of the present invention;

FIG. 2 is a cross-sectional view taken generally along line 2—2 of FIG. 1 and showing the housing in the "closed" position in full lines and in the "open" position in broken lines;

FIG. 3 is an exploded perspective view illustrating assembly of the present invention; and FIG. 4 is an enlarged view taken generally along line 4—4 of FIG. 1 showing insertion of the assembly of the present invention into the chassis of the apparatus.

DESCRIPTION OF THE PREFERRED EMBODIMENT

While the present invention is susceptible of embodiment in different forms, there are shown in the drawings and will hereinafter be described a presently preferred embodiment, with the understanding that the present disclosure is to be considered as an exemplification of the principles of the invention and is not intended to limit the invention to the embodiment illustrated.

With reference now to FIG. 1, therein is illustrated an air purification apparatus, which functions by subjecting air to an electrical discharge for generating oxygen molecules of a higher than usual order, such as a controlled amount of $O_3$, $O_4$, and $O_5$. The beneficial properties of these higher forms, particularly $O_4$ and $O_5$, are utilized in modern environmental control systems for air purification. The purification apparatus of the present invention has been found effective in principally generating heavy oxygen molecules of an order higher than $O_3$.

Purification apparatus 10 includes a chassis 12 comprising a generally rectangular outer chassis 14 and an inner chassis 16. Outer chassis 14 may include a removable cover plate for facilitating access to apparatus 10.

Apparatus 10 further includes a heavy oxygen molecule generator 18 which is mounted on inner chassis 16. Apparatus 10 also includes a transformer arrangement and electrical circuit 20 for supplying high voltage electricity to generator 18. If desired, transformer and electrical circuit 20 may be provided to supply electricity of variable rather than fixed voltage by including a rheostat or other similar variable component. An electrical conduit 22 is provided for connecting the transformer and electrical circuit to a suitable source of electric power, typically 110 to 120 alternating current. A switch 24 is provided for selectively turning the apparatus on and off.

As discussed, apparatus 10 functions to produce heavy oxygen molecules by subjecting air to an electrical discharge. A blower 26 is provided for moving air through generator 18. Blower 26 may include a removable filter element 27, with louvers 28 and 30 being provided in outer chassis 14 for accommodating air flow through blower 26 and generator 18.

With reference now to FIGS. 2 and 3, the improved construction and mounting of generator 18 is illustrated. Generator 18 includes a unitary metallic housing assembly 32. Generator 18 further includes a plurality of generally parallel electrode elements 34 arranged in an aligned side-by-side array. Each electrode element 34 preferably comprises a flattened tubular spiral or coil of metal wire mesh, preferably stainless steel. Experience has shown that coiling each electrode element 34 so as to form "a tube within a tube" is particularly effective in providing the desired generation of heavy oxygen molecules.

Generator 18 further includes a plurality of dielectric plates for affecting an insulating separation between adjacent electrode elements 34. Specifically, a first set of dielectric plates 36 is provided in spaced, generally parallel relation between adjacent electrode elements 34. A second set of dielectric plates 38 are provided which are generally perpendicular to dielectric plates 36 and are respectively disposed on opposite sides thereof between portions of electrode elements 34 and housing 32. Each dielectric plate is preferably fabricated from mica sheet.

The array of electrode elements 34 and dielectric plates 36 and 38 is arranged within housing 32 preferably so that there is maximum surface contact between the electrode elements 34, dielectric plates 36, and housing 32. To this end, electrode elements 34 are fabricated such that their thickness or depth before assembly (as shown in FIG. 3) is greater than their thickness when assembled as shown in FIG. 2. It will be appreciated that the resilient nature of the metal wire mesh of which electrode elements 34 are fabricated is such that each electrode element 34 is biased outwardly of itself when compressed. Thus, the assembled array of electrode elements 34 and dielectric plates 36 within housing 32 is such that the electrode elements are biased into contact with dielectric plates 36 and housing 32, the configuration of housing facilitating construction in this fashion as will be further described.

Operation of the present purification apparatus is provided by subjecting air to an electrical discharge. To this end, an electrical potential be created across the interfacing surfaces of electrode elements 34 and dielectric plates 36. In order to create this electrical potential, housing 32 is mounted on inner chassis 16, which acts as the ground for transformer and electrical circuit 20. Thus, housing 32 is also grounded and is in electrical contact with the outwardly disposed electrode elements 34.

The other side of transformer and electrical circuit 20 is connected with generator 18 by an electrode probe in the form of a loop wire 40. Looped wire 40 is connected with the electrical circuit and supported by an electrode support 42 mounted on inner chassis 16. Looped wire 40 is somewhat elongated in configuration, and is adapted to electrically contact portions of the centrally disposed electrode element 34. Thus, current supplied to generator 18 by transformer and electrical circuit 20 is carried through housing 32 and electrode wire 40.

As previously noted, it is desirable that electrode elements 34 be in good contact with dielectric plates 36 disposed therebetween. To enhance this contact, housing 32 of the present invention is such that electrode elements 34 are releasably retained and urged into contact with dielectric plates 36. Further, housing 32 facilitates assembly and disassembly of the array in generator 18. This is achieved by the unitary nature of housing 32 which accommodates modular construction of oxygen molecule generator 18.

As illustrated, housing 32 includes first and second spaced, generally parallel opposite housing sides 44 and 46, and third and fourth spaced, opposite housing sides 48 and 50. As shown in FIG. 3, second, third and fourth sides 46, 48 and 50 are integrally formed, with third side 48 being joined integrally with first side 44 along housing flange 52 such as by welding, or other suitable mechanical fastening means. Housing flange 52 includes fastener hole 54 for mounting generator 18 on inner chassis 16 as will be described.

While housing assembly 32 is illustrated as including integrally assembled first side 44 and second, third, and fourth sides 46, 48, 50, it will be appreciated that the housing could be fabricated from a single piece of metal appropriately formed.

As best shown in phantom in FIG. 2, housing 32 is constructed such that fourth side 50 is resiliently biased away from first side 44. It will be appreciated that this biasing is provided by the resilience of the metal from which housing 32 is fabricated. Thus, the phantom illustration of housing 32 in FIG. 2 shows the configuration of the housing after it is fabricated, with the housing being "open." As noted, the open configuration facilitates assembly of the resilient electrode/dielectric array in the housing.

In order to maintain housing 32 in the "closed" configuration illustrated in solid line in FIG. 2, the housing includes a releasable locking arrangement. Specifically, one edge portion of first side 44 of the housing includes a locking flange 56 integral therewith, preferably extending the length of the edge portion. The locking arrangement further includes a locking lip 58 integral with an edge portion of fourth housing side 50 which is adapted to cooperate with locking flange 56 for releasably lockingly connecting fourth side 50 to first side 44. Notably, the construction of housing 32 such that fourth side 50 is urged away from first side 44 acts to urge and bias locking lip 58 into engagement with locking flange 56. This assures that housing 32 remains closed after the array of electrode elements and dielectric plates is inserted therein, and the housing is manipulated to compress the housing and the array so that locking lip 58 firmly and securely engages locking flange 56. Additionally, the resilient nature of each electrode element 34 further urges and biases lip 58 into engagement with flange 56, while the electrode elements are urged into contact with dielectric plates and the housing.

After assembly in the above fashion with electrode elements 34 and dielectric plates 36 and 38 properly aligned and positioned adjacent each other, the modular generator 18 is complete and ready for mounting on inner chassis 16 of air purification apparatus 10. Notably, the construction of generator 18 as described precludes the necessity of bending an end portion of the metal mesh of each electrode element 34 so that it engages an inward portion of the element, as taught by the above-referenced patent.

A further feature of the present invention is the novel arrangement provided for mounting of the modular generator assembly on the chassis of the apparatus. As shown in FIG. 4, inner chassis 16 includes a stamped or otherwise formed chassis mount flange 60. In order to mount generator 18 on inner chassis 16, the generator may be easily positioned adjacent to chassis 16 as shown in solid line in FIG. 4. Preferably, electrode wire 40 is movably mounted on electrode support 42 so that wire 40 may be easily positioned within the centrally disposed electrode element 34 of generator 18 as the generator is mounted on the chassis.

With further reference to FIG. 4, the mounting of generator 18 is completed by moving the generator is a direction indicated by the arrow so that locking flange 56 of housing 32 engages and fits within chassis flange 60. After generator 18 is moved to the position illustrated in phantom in FIG. 4, mounting is completed by insertion of mechanical fastener 62 through fastener hole 54 and an inner chassis fastener hole 64 so that generator 18 is held securely in position on inner chassis 16 with electrode wire 40 positively contacting centrally disposed electrode element 34.

As will be appreciated, construction of air purification apparatus 10 in accordance with the above description facilitates assembly and disassembly of the unit. Thus, not only may the unit be manufactured more economically, but the required periodic inspection and maintenance of these units is facilitated by the novel construction.

From the foregoing, it will be observed that numerous variations and modifications may be effected without departing from the true spirit and scope of the novel concept of the subject invention. It will be understood that no limitations with respect to the specific embodiment illustrated herein is intended or should be inferred. It is, of course, intended to cover by the appended claims all such modifications as fall within the scope of the claims.

What is claimed is:

1. An air purification apparatus comprising:
    a plurality of electrode elements each comprising a flattened tubular spiral of metal wire mesh disposed in a side-by-side array,
    dielectric means for effecting an insulating separation between adjacent electrode elements comprising a first set of dielectric plates separating adjacent ones of said electrode elements and a second set of dielectric plates perpendicular to said first set,
    means for establishing an electric discharge between adjacent ones of said elements, and
    unitary housing means for releasably retaining electrode elements in said side-by-side array and urging said electrode elements into contact with said first set of dielectric plates,
    said housing means comprising a generally rectangular housing with open opposite ends within which said electrode elements are contained so that ends thereof face said open ends, said housing including first and second opposite sides, said second set of dielectric plates being respectively disposed between said electrode elements and said first and second sides, a third side integral with and extending between said first and second sides, a fourth side integral with said second side and extending generally toward said first side, and releasable locking means for releasably connecting said fourth side to said first side, said releasable locking means comprising a reversely bent locking flange integral with an edge portion of said first side and an outwardly extending locking lip integral with an edge portion of said fourth side cooperating with said locking flange for releasably connecting said edge portion of said fourth side to said edge portion of said first side, said housing means being formed of a resilient material whereby said fourth side is biased to an open clearance position disposed at an acute angle with respect to said first side and away from said third side accommodating insertion of said electrode elements and said first and second sets of dielectric plates into said housing before said fourth side is releasably connected to said first side by insertion of said locking lip behind said locking flange and locating said fourth side in a closed position wherein said fourth side is disposed perpendicularly with respect to said first side, the resiliency of said housing means biasing said locking lip into engagement with said locking flange and said electrodes and dielectric means into engagement with one another and with said housing means.

2. The air purification apparatus of claim 1, and a chassis for holding said housing in association with said means for establishing an electric discharge, and releasably mounting means facilitating releasable mounting of said housing to said chassis comprising a mounting flange integral with said chassis adapted to receive and retain said locking flange, and mechanical fastener means for releasably connecting an edge portion of said first side opposite said locking flange to said chassis whereby assembly and disassembly of said apparatus is facilitated.

* * * * *